(12) United States Patent
Liu et al.

(10) Patent No.: US 12,125,974 B1
(45) Date of Patent: Oct. 22, 2024

(54) METHOD FOR DENSIFICATION OF SULFIDE SOLID ELECTROLYTES

(71) Applicants: LG ENERGY SOLUTION, LTD., Seoul (KR); THE REGENTS OF THE UNIVERSITY OF CALIFORNIA, Oakland, CA (US)

(72) Inventors: Ping Liu, San Diego, CA (US); Junghwa Hong, Newark, CA (US); Mengchen Liu, San Diego, CA (US); Ke Zhou, San Diego, CA (US); Jeong Woo Oh, San Diego, CA (US); Min-Sang Song, Daejeon (KR)

(73) Assignees: LG ENERGY SOLUTION, LTD., Seoul (KR); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 18/485,902

(22) Filed: Oct. 12, 2023

(51) Int. Cl.
*H01M 10/0562* (2010.01)

(52) U.S. Cl.
CPC .......... *H01M 10/0562* (2013.01); *H01M 2300/0068* (2013.01)

(58) Field of Classification Search
None
See application file for complete search history.

(56) References Cited

U.S. PATENT DOCUMENTS

2018/0108943 A1* 4/2018 Shin .............. C09D 123/0853

* cited by examiner

*Primary Examiner* — Scott J. Chmielecki
(74) *Attorney, Agent, or Firm* — Birch, Stewart, Kolasch & Birch, LLP (57) ABSTRACT

Disclosed is a sulfide-containing solid electrolyte material with an organic coating, as well as densified pellets containing this solid electrolyte material, a solid electrolyte thereof, and a solid state battery containing the solid electrolyte. According to aspects of the disclosure, the coating comprising a compound of Chemical Formula (1) or Chemical Formula (2) is formed on the surface of a sulfide-containing solid electrolyte material, e.g., the organic coating may comprise a compound having a thiol with a long hydrophobic tail, such as 1-undecanethiol. The coating provides densification of sulfide-containing solid electrolyte materials, and facilitates the ionic and lithium atomic diffusion coefficient at sulfide grain boundaries during pressing, thus achieving the densification of sulfide solid state electrolyte.

36 Claims, 7 Drawing Sheets

1-undecanethiol Coated LPSC

METHOD FOR DENSIFICATION OF SULFIDE SOLID ELECTROLYTES

FIELD OF TECHNOLOGY

According to aspects of this disclosure, a sulfide-containing solid state electrolyte material is modified with an organic coating, e.g., a thiol having a hydrophobic chain. The present disclosure relates to methods for the densification of sulfide-containing solid electrolyte materials, including a sulfide-containing solid electrolyte material with an organic coating, densified pellets containing this solid electrolyte material, a solid electrolyte thereof, and a solid state battery containing the solid electrolyte.

BACKGROUND

There continues to be an increase in electrified transportation, exemplified by the widespread adoption of electric vehicles (EVs) and the emergence of urban air mobility (UAM0 vehicles. Simultaneously, there is a growing demand for stationary energy storage systems, notably in the residential and industrial sectors, powered by solar and wind generators. This shift is driven in part by the pressing need to mitigate the adverse environmental and climate impacts associated with traditional internal combustion engines and other non-renewable means of power generation. Thus, the development of battery technologies with high energy density, while also ensuring enhanced safety, has become an imperative.

Conventional liquid lithium-ion batteries were critical to the advancement of electrified transportation and energy storage systems, and have had a significant and positive impact on green energy and climate change mitigation efforts. While such conventional liquid lithium-ion batteries are superior to many other energy sources, liquid lithium-ion batteries also have certain limitations. For example, various safety mechanisms are critical for lithium-ion batteries to restrict voltage and internal pressures, but these safety features typically result in increased weight and performance limitations in certain instances. Moreover, lithium-ion batteries are susceptible to aging, leading to capacity loss and eventually failure after a number of years of use.

Recent research efforts have focused on solid state batteries, which offer higher energy density and are safer than batteries with a liquid electrolyte system, such as conventional lithium-ion batteries. In a conventional solid state battery, a solid electrolyte replaces a liquid electrolyte system, and thus reduces the risk of ignition or explosion, thereby increasing safety. However, a disadvantage of solid electrolytes is the possible loss of Li ion transfer path due to cracks and voids that inevitably occur during charging and discharging processes, the penetration of lithium dendrite through cracks and voids and which can eventually result in the failure of ion transfer and battery short.

Thus, there exists a need for sulfide-based solid electrolyte for an all solid state battery, which has high ionic conductivity, thermal stability, stronger mechanical properties and interfacial compatibility compared to existing polymer and oxide solid electrolytes.

DISCLOSURE

Technical Problem

The present disclosure is directed to methods for the densification of sulfide-containing solid electrolyte materials, as well as solid electrolytes compositions thereof, and solid state batteries thereof. According to aspects of this disclosure, a sulfide-containing solid state electrolyte material is modified with an organic compound, e.g., a thiol having a hydrophobic chain. According to one or more aspects, the densification technology provides improved safety, performance, energy density and lifespan.

Technical Solution

The present disclosure is directed to using an organic coating for a sulfide-containing solid electrolyte suitable for use in a solid state battery, as well as a coated sulfide-containing solid electrolyte and a sulfide-containing solid electrolyte composition. According to the present disclosure, the density of the resulting sulfide-containing solid electrolyte composition is increased. In some aspects, modifying the interface structure facilitates the ionic and lithium atomic diffusion coefficient at sulfide grain boundaries during pressing, thus achieving the densification of sulfide solid state electrolyte.

Additionally, the present disclosure is further directed to providing a solid state battery having good electrical and chemical properties including safety, heat resistant stability, energy density, life characteristics and Coulombic efficiency. It will be readily appreciated that these and other objects and advantages of the present disclosure may be realized by means or methods described in the appended claims and a combination thereof.

An aspect of the present disclosure relates to a sulfide-containing solid electrolyte with an organic coating, as well as a solid state battery containing the electrolyte. In certain aspects, the organic coating is a protective agent for the sulfide-containing solid electrolyte under ambient conditions. For instance, the organic coating may provide protection from moisture and/or air.

In an aspect of the disclosure, the organic coating is formed from a long chain thiol, which is applied to a sulfide-containing solid electrolyte material, e.g., such as Lithium phosphorus sulfur chloride, $Li_6PS_5Cl$ ("LPSCl" or "LPSC"). The coating has a negligible impact on the ion conductivity of the electrolyte. Some mechanistic studies appear to reveal that the thiol group interacts with the sulfur (of the sulfide-containing solid electrolyte) on the surface, while the hydrocarbon tail may be oriented outward, and form a "lipid barrier" or coating on the surface.

An aspect relates to a solid electrolyte composition comprising: a sulfide-containing solid electrolyte material, having a surface where an organic coating on the sulfide-containing solid state electrolyte material is formed. Preferably, the organic coating is formed on the surface of the sulfide-containing solid state electrolyte material. In some aspects, the coating is formed from at least one compound of Chemical Formula 1 or Chemical Formula 2:

R-A      Chemical Formula (1)

R-A'-R      Chemical Formula (2)

wherein: A is a SH group, an isocyanate, an amine, or a leaving group (e.g., including but not limited to an organosilicon compound such as a triethoxysilyl or a trimethoxysilyl); A' is a —S— moiety or a —S—S— moiety; and each R is independently a substituted or unsubstituted C3-C20 alkyl group. The solid electrolyte composition can then be used to make a solid electrolyte for a solid state battery.

In an aspect, the organic coating is formed on the surface of the sulfide-containing solid state electrolyte material through adsorption. Thus, in some aspects, the compound of Chemical Formula 1 or Chemical Formula 2 is attached to the surface of the sulfide-containing solid state electrolyte material by a non-covalent attachment, including but not limited to chemisorption, van der Waals interaction, or ionic interaction.

Alternatively, the coating may be formed through the reaction of a compound of Chemical Formula 1 and/or Chemical Formula 2 and the sulfide-containing solid state electrolyte material, e.g., a reaction product or the residue of the compound of Chemical Formula 1 and/or Chemical Formula 2 forms the coating. Thus, in some aspects of the disclosure, the compound of Chemical Formula 1 or Chemical Formula 2 reacts with the sulfide-containing solid state electrolyte material to form a covalent bond. In some aspects, the resulting covalent bond is a sulfide bond or a disulfide bond.

In some aspects, in the compound of Chemical Formula 1, A is a thiol (—SH group), an isocyanate, an amine or a suitable leaving group. In some aspects of the disclosure, the leaving group may be a triethoxysilyl or a trimethoxysilyl.

In an aspect, in the compound of Chemical Formula 1 or Chemical Formula 2, at least one of R is a C6-C16 alkyl group. In an aspect, in the compound of Chemical Formula 1 or Chemical Formula 2, at least one of R is a C8-C12 alkyl group.

In an aspect, the compound of Chemical Formula 1 or Chemical Formula 2 has a total of 6 to 16 carbons. In an aspect, in the compound of Chemical Formula 1 or Chemical Formula 2 has a total of 8 to 12 carbons.

In an aspect, in the compound of Chemical Formula 1 or Chemical Formula 2, at least one of R is a substituted C3-C20 alkyl group, wherein there are one or more substituents selected from fluorine, chlorine, bromine, ester or ketone moieties.

In an aspect, the compound of Chemical Formula 1 is 1-undecanethiol.

In an aspect, the sulfide-containing solid electrolyte material is selected from the group consisting of an inorganic-based electrolyte material and an organic-based electrolyte material. According to aspects of the disclosure, the sulfide-containing solid electrolyte material is an inorganic electrolyte.

In some aspects of the disclosure, the sulfide-containing solid electrolyte comprises at least one selected from $Li_3P_7S_{11}$, $Li_{10}GeP_2S_{12}$, and $Na_3PS_4$ and/or $Li_6PS_5Cl$.

In some aspects of the disclosure, the sulfide-containing solid electrolyte comprises at least one selected from LPS-based glass or glass ceramic of formula $xLi_2S \cdot yP_2S_5$, wherein x+y=1.

In some aspects of the disclosure, the sulfide-containing solid electrolyte comprises an argyrodite-based solid electrolyte of formula $Li_6PS_5X$, wherein X is Cl, Br, or I.

In some aspects of the disclosure, the sulfide-containing solid electrolyte comprises an argyrodite-based solid electrolyte of formula $Li_{6-y}PS_{5-y}Cl_{1+y}$, where y is <1.

In another aspect, the disclosure relates to a method for making the solid electrolyte composition, comprising: providing a sulfide-containing solid electrolyte material, and combining at least one compound of Chemical Formula 1 or Chemical Formula 2 as described herein to form a coated sulfide-containing solid electrolyte material.

In another aspect, the disclosure relates to a method for making a solid electrolyte, comprising providing a sulfide-containing solid electrolyte, and combining the solid electrolyte with at least one compound of Chemical Formula 1 or Chemical Formula 2 as described herein to form a coated sulfide-containing solid electrolyte material composition. In some aspects, the coated sulfide-containing solid electrolyte material composition is provided in the form of pellets.

Another aspect relates to a solid electrolyte comprising the solid electrolyte composition according to claim 1.

Another aspect relates to an all solid state battery comprising: a negative electrode, a positive electrode; and a solid electrolyte as described herein, wherein the solid electrolyte is interposed between the negative electrode and the positive electrode.

Advantageous Effects

The coated solid electrolyte material is used to densify the sulfide-containing solid electrolyte. The sulfur-containing solid electrolyte composition, as well as a solid electrolyte and solid state battery thereof are described herein, which use an organic coating for the sulfide-containing electrolyte material, which provides densification of the solid electrolyte.

Conventional methods of sulfide solid electrolyte densification were mostly achieved by hot pressing, which makes the pellet brittle and compromises the property of ductility. However, according to the present disclosure, an organic compound (e.g., 1-undecanthiol, etc.) is used to form a coating on a sulfide-containing solid electrolyte (e.g., LPSC, etc.) by mixing the organic compound and sulfide-containing solid electrolyte material under room temperature. The process is less complex and cost-effective compared to the current state-of-the-art. Further, the densification effect of this disclosure is better than existing methods.

For instance, an organic coating of a long chain alkyl thiol (e.g., such as 1-undecanethiol) may be chemisorbed to the sulfide-containing solid electrolyte surface. In some aspects, for example, the organic compound may be adsorbed onto the surface of the sulfide-containing solid electrolyte, or attached, for instance, via weak Van der Waals forces. The functional thiol group can interact with the sulfide-containing solid electrolyte (e.g., $Li_6PS_5Cl$) forming a weak bond, while the hydrophobic carbon tail acts as coating on the surface. Preferably, the organic coating is noninvasive and does not compromise the conductivity or performance of the sulfide-containing solid electrolyte.

For instance, a compound of Chemical Formula (1), such as undecanethiol, chemically absorbs on the surface of LPSC by S—S bond, which changes the interface structure of LPSC in the grain boundaries, but does not damage the bulk structure. The new interface facilitates the ionic and atomic diffusion coefficient of LPSC at the grain boundaries and make the LPSC pellets denser under same pressing pressure. The densified sulfide solid state electrolyte dramatically suppresses the lithium dendrite penetration in the lithium metal all solid state batteries that the critical current density is increased by 4 times from 0.6 mA $cm^{-2}$ to 2.5 mA $cm^{-2}$. The Li/Li symmetric cell has been cycled at 1 mA $cm^{-2}$ for more than 6 months at room temperature, which is achieved for the first time by using the densified sulfide solid state electrolyte.

BRIEF DESCRIPTION OF THE DRAWINGS

The accompanying drawings illustrate aspects of the present disclosure, and together with the detailed disclosure, serve to provide a further understanding of the technical aspects of the present disclosure, and the present disclosure should not be construed as being limiting to the drawings. In the drawings, for clarity of description, the shape, size, scale or proportion of the elements may be exaggerated for emphasis.

DETAILED DESCRIPTION

Hereinafter, the present disclosure will be described in detail. It should be understood that the terms or words used in the specification and the appended claims should not be construed as limited to general and dictionary meanings, but rather interpreted based on the meanings and concepts corresponding to the technical aspects of the present disclosure on the basis of the principle that the inventor is allowed to define terms appropriately for the best explanation. Therefore, the aspects of the disclosure described herein and the elements shown in the drawings are just aspects of the present disclosure, but not intended to fully describe the technical aspects of the present disclosure, so it should be understood that other equivalents and modifications could have been made thereto at the time the application was filed. Unless defined otherwise, all the technical and scientific terms used herein have the same meanings as commonly known by a person skilled in the art. In the case that there is a plurality of definitions for the terms herein, the definitions provided herein will prevail.

Unless specified otherwise, all the percentages, portions and ratios in the present disclosure are on weight basis.

Unless indicated to the contrary, the numerical parameters set forth in the following specification and attached claims are approximations that may vary depending upon the desired properties sought to be obtained according to aspects of the disclosure. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values.

While compositions and methods are described herein in terms of "comprising" various components or steps, the compositions and methods can also "consist essentially of" or "consist of" the various components and steps. The term "comprise(s)" or "include(s)" when used in this specification, specifies the presence of stated elements, but does not preclude the presence or addition of one or more other elements, unless the context clearly indicates otherwise.

The terms "about" and "substantially" are used herein in the sense of at, or nearly at, when given the manufacturing and material tolerances inherent in the stated circumstances and are used to prevent the unscrupulous infringer from unfairly taking advantage of the present disclosure where exact or absolute figures are stated as an aid to understanding the present disclosure. The terms "about" and "approximate", when used along with a numerical variable, generally means the value of the variable and all the values of the variable within an experimental error (e.g., 95% confidence interval for the mean) or within a specified value ±10% or within a broader range. Unless otherwise indicated, all numbers expressing quantities of ingredients, properties such as molecular weight, reaction conditions, and so forth used in the present specification and associated claims are to be understood may be modified by the term "about."

"A and/or B" when used in this specification, specifies "either A or B or both."

An aspect of the present disclosure relates to a solid state battery comprising a solid electrolyte material as an electrolyte. Specific examples of the solid state battery include any type of primary battery, secondary battery, fuel cell, solar cell or capacitor such as a super capacitor. In particular, the secondary battery is, to be specific, a lithium ion secondary battery. Aspects of the invention here may be implemented in a secondary battery with various form factors or battery formats, including for example in a pouch-type battery, a cylindrical battery, or a prismatic battery.

In an aspect of the disclosure, the solid state battery according to the present disclosure comprises a negative electrode, a positive electrode and a solid electrolyte interposed between the negative electrode and the positive electrode. Hereinafter, the configuration and effect of the present disclosure will be described in detail.

In the present disclosure, the solid electrolyte composition comprises a sulfide-containing solid electrolyte material that has an organic coating. In an aspect, a long chain thiol may be used as the organic coating. According to aspects of the disclosure, the coating contains a hydrophobic chain.

For purposes of the present disclosure, any suitable sulfide-containing electrolyte material may be used. As used here, "sulfide based electrolyte" refers to an electrolyte that includes inorganic materials containing S which conduct ions (e.g., $Li^+$), and which are suitable for electrically insulating the positive and negative electrodes of an electrochemical cell. Exemplary sulfide-containing electrolytes are set forth in Shaojie Chen et al., "Sulfide solid electrolytes for all-solid-state lithium batteries: Structure, conductivity, stability and application," Energy Storage Materials, Volume 14, Pages 58-74 (September 2018), which is hereby expressly incorporated by reference in its entirety.

For example, many sulfide-containing electrolyte materials are particularly attractive due to their superionic conductivities (as high as ~10−2 S cm−1) and deformability. In particular, $Li_3P_7S_{11}$, $Li_{10}GeP_2S_{12}$, and $Na_3PS_4$ and $Li_6PS_5Cl$ have been reported to exhibit high ionic conductivities; some even close to those of liquid electrolytes. According to aspects of the disclosure, the sulfide solid electrolyte materials also provide a low Young's modulus, which is beneficial for producing favorable interface contacts with electrode materials by simple cold pressing at room temperature.

The sulfide-containing solid electrolyte, according to aspects of the disclosure, may contain sulfur (S) and have the ionic conductivity of metal belonging to Group I or II in the periodic table, e.g., $Li^+$. Additionally, in an aspect of the present disclosure, the selected solid electrolyte has the ionic conductivity of $1 \times 10^{-5}$ S/cm, or according to some aspects of the disclosure, $1 \times 10^{-3}$ S/cm or more.

Non-limiting examples of the sulfide-containing solid electrolyte may include Li—P—S-based glass, Li—P—S-based glass ceramic and argyrodite-based sulfide-containing solid electrolyte.

Non-limiting examples of the sulfide-containing solid electrolyte may include at least one of $xLi_2S\text{-}yP_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—SnS, $Li_2S$—$P_2S_5$—$Al_2S_3$, $Li_2S$—$GeS_2$ or $Li_2S$—$GeS_2$—ZnS, Li6PS5X (X=at least one of Cl, Br or I).

In an aspect of the present disclosure, the sulfide-containing solid electrolyte may comprise at least one selected from LPS-based glass or glass ceramic such as $xLi_2S\text{-}yP_2S_5$, or an argyrodite-based sulfide-containing solid electrolyte ($Li_6PS_5X$; X=Cl, Br, I).

The sulfide-containing solid electrolyte material is processed to form a coating on its surface. The sulfur or leaving group appears to react with the sulfur in the electrolyte material to interact non-covalently, or form a covalent bond, e.g., a sulfide bond or a disulfide bond.

The sulfur of the organic compound may be attached to the surface of the solid electrolyte material, (e.g., perhaps forming disulfide bond or a sulfide bond at one end), and the hydrophobic tail is arranged to surround the electrolyte material.

To form an organic coating, the sulfide-containing solid electrolyte material may be combined with at least one compound of Chemical Formula 1 or Chemical Formula 2:

R-A                    Chemical Formula (1)

R-A'-R                 Chemical Formula (2)

wherein: A is a —SH group, an isocyanate, an amine, or a suitable leaving group (e.g., such as a triethoxysilyl or a trimethoxysilyl); A' is a —S— moiety or a —S—S— moiety; and each R is independently a substituted or unsubstituted C3-C20 alkyl group.

In certain aspects each R group is independently selected so that the compound of Chemical Formula 1 or Chemical Formula 2 will be a liquid. According to some aspects of the disclosure, the total number of carbons (including the chain and substituents) will be from 6 to 16 carbons, or according to some aspects of the disclosure, from 6 to 12 carbons, from 8 to 12 carbons, or from 10 to 12 carbons. The compound of Chemical Formula 1 may have a total of 6 carbons, 7 carbons, 8 carbons, 9 carbons, 10 carbons, 11 carbons, 12 carbons, 13 carbons, 14 carbons, 15 carbons, 16 carbons, 17 carbons, 18 carbons, 19 carbons, or 20 carbons. If the total number of carbons is too low, the compound may be too volatile for use. If the total number of carbons is too high, the compound may not be a liquid. Thus, according to some aspects of the disclosure, the number of total carbons, as well as the substituents and main chains can be adjusted as needed so that the compound is a liquid.

Each R group is independently a substituted or unsubstituted C3-C20 alkyl group, including, but not limited to a substituted or unsubstituted n-propyl, isopropyl, n-butyl, isobutyl, sec-butyl, tert-butyl, n-pentyl, tert-pentyl, isopentyl, n-hexyl, isohexyl, sec-hexyl, tert-hexyl, n-heptyl, iso-heptyl, sec-heptyl, tert-heptyl, n-octyl, isooctyl, sec-octyl, tert-octyl, n-nonyl, isononyl, sec-nonyl, tert-nonyl, n-decyl, isodecyl, sec-decyl, tert-decyl, n-undecyl, isoundecyl, sec-undecyl, tert-undecyl, n-dodecyl, isododecyl, sec-dodecyl, tert-dodecyl, etc.

The R group may be substituted with one or more groups, including but not limited to ester, ketone, halogen (fluorine, chlorine, bromine), and/or one or more C3-C20 alkyl groups (e.g., a C3-C8 alkyl group). In some aspects, the R group may be substituted with an aryl (e.g., phenyl) or a heteroaryl group (e.g., a five or six member ring, including but not limited to pyridine, pyrrole, furan, or thiophene).

The term "leaving group" may be understood as defined by the IUPAC, e.g., it may be an atom or group of atoms that detaches from the main or residual part of a substrate during a reaction or elementary step of a reaction. For instance, a leaving group may be a fragment that departs with a pair of electrons in heterolytic bond cleavage. In certain aspects, leaving groups may be anions or neutral species, departing from neutral or cationic substrates. Suitable leaving groups may be used, which are compatible with the solid electrolyte material.

In some aspects, the A group may be a "triethoxysilyl" moiety (e.g., derived from $HSi(OC_2H_5)_3$) or "trimethoxysilyl" (e.g., derived from $HSi(OCH_3)_3$).

The term "thiol" may be understood as an organosulfur compound of the form R—SH, where R represents an alkyl or other organic substituent.

The term "isocyanate" may be understood as a functional group with the formula R—N═C—O, where R may be an alkyl or aryl group.

The term "amine" may be understood as a compounds or a functional group that contain a basic nitrogen atom with a lone pair. Amines are formally derivatives of ammonia (NH3), wherein one or more hydrogen atoms have been replaced by a substituent such as an alkyl or aryl group (e.g., alkylamines and arylamines). The substituent —$NH_2$ is called an amino group. In certain aspects, the amine may include primary amines, secondary amines, and/or tertiary amines. In certain aspects, amino groups can be further converted into a useful leaving group, e.g., by conversion to an ammonium salt, aryl(sulfonyl)amino groups, etc.

In some aspects, the sulfide-containing solid electrolyte material, and the compound of Chemical Formula 1 may be combined in a weight ratio of about 1:1 to 25:1, or according to some aspects, a weight ratio of about 1:1 to 10:1, a weight ratio of about 1:1 to 5:1, or a weight ratio of about 1:1.

Since sulfide-containing materials are sensitive to air and moisture, and might decompose to produce toxic gas such as $H_2S$, all the synthesis and test steps are, according to some aspects of the disclosure, performed in a glovebox or suitable apparatus (e.g., MBraun MB 200B, $H_2O<0.5$ ppm, $O_2<0.5$ ppm) filled with argon. Optionally, the reaction mixture of the sulfide-containing solid electrolyte material, and the compound of Chemical Formula 1 may further comprise a suitable solvent to aid in the dispersion.

Suitable reaction conditions may be used. In an aspect, the reaction temperature may be from room temperature to about 50° ° C. In some aspects, the reaction temperature may be from about 15° ° C. to about 40° C., from about 20° C. to about 40° ° C., from about 25° C. to about 40° C.

In an aspect, the reaction time may be about 30 minutes. In some aspects, the reaction time may be from about 1 hour to about 8 hours, and according to some aspects, from about 2 hours to about 7 hours or from about 3 hours to about 5 hours.

The progress of the reaction can be monitored using any suitable technique, including but not limited to a suitable technique, e.g., such as X-ray Photoelectron Spectroscopy or Nuclear Magnetic Resonance (NMR).

After the reaction is complete, the coated solid electrolyte material may be dried under any suitable conditions. In an aspect, the drying temperature will be from about 30° C. to about 100° C., from about 40° C. to about 100° C., from about 50° ° C. to about 100° C. According to some aspects of the disclosure, the drying is conducted under vacuum conditions. In an aspect, the drying time will be 30 minutes or longer. In another aspect, the drying time will be one hour or longer, and, according to some aspects, 2 hours or longer, 8 hours or longer, or 12 hours or longer.

In the present disclosure, the average particle size of the sulfide-containing solid electrolyte material may be adjusted to an appropriate range for the solid state battery. In some aspects of the present disclosure, the solid electrolyte may have an average particle size of 0.1 μm to 50 μm.

In some aspects of the present disclosure, the solid electrolyte membrane may be manufactured by any suitable method. For example, after the solid electrolyte material is coated, it may optionally be combined with other components if needed, and mixed to obtain a homogenous mixture. Subsequently, this mixture may be added to a predetermined organic solvent and dispersed to prepare a slurry, the slurry is applied to a release plate, and then dried to form a sheet shape. If necessary, the result of the sheet shape may be pressed to obtain a solid electrolyte membrane.

The thickness of the solid electrolyte layer formed by the lithium-tin-metal-sulfide based compound may be different depending on the structure of the all-solid-state battery, and can be adapted as needed. However, for example, according to some aspects, it may be 0.1 μm or more and 1 mm or less, and according to additional aspects, 1 μm or more and 100 μm or less. The solid electrolyte, according to some aspects, has high lithium ion conductivity, and the lithium ion conductivity at room temperature is, according to some aspects, $1 \times 10^{-4}$ S/cm or more, for example.

In an aspect, the solid electrolyte may further include another solid electrolyte commonly used in the all-solid-state battery. As an example, a combination of an inorganic solid electrolyte and/or an organic solid electrolyte may be used.

In the case of the inorganic solid electrolyte, a ceramic material, a crystalline material or an amorphous material may be used, and the inorganic solid electrolytes such as thio-LISICON ($Li_{3.25}Ge_{0.25}P_{0.75}S_4$), $Li_2S$—$SiS_2$, LiI—$Li_2S$—$SiS_2$, LiI—$Li_2S$—$P_2S_5$, LiI$Li_2S$—$P_2O_5$, LiI—$Li_3PO_4$—$P_2S_5$, $Li_2S$—$P_2S_5$, $Li_3PS_4$, $Li_7P_3S_{11}$, $Li_2O$—$B_2O_3$, $Li_2O$—$B_2O_3$—$P_2O_5$, $Li_2O$—$V_2O_5$—$SiO_2$, $Li_2O$—$B_2O_3$, $Li_3PO_4$, $Li_2O$—$Li_2WO_4$—$B_2O_3$, LiPON, LiBON, $Li_2O$—$SiO_2$, LiI, $Li_3N$, $Li_5La_3Ta_2O_{12}$, $Li_7La_3Zr_2O_{12}$, $Li_6BaLa_2Ta_2O_{12}$. $Li_3PO_{(4-3/2w)}Nw$ (wherein w is w<1), and $Li_{3.6}Si_{0.6}P_{0.4}O_4$ can be used.

In addition, examples of the organic solid electrolyte include organic solid electrolytes prepared by mixing lithium salt to polymeric materials such as polyethylene derivatives, polyethylene oxide derivatives, polypropylene oxide derivatives, phosphate ester polymers, agitation lysine, polyester sulfide, polyvinyl alcohol, and polyvinylidene fluoride. In this case, these may be used alone or in combination of at least one.

The above-described coated sulfide-containing electrolyte material can be used for a solid electrolyte for an all-solid-state battery. The all-solid-state battery contains a positive electrode, a negative electrode, with the solid electrolyte interposed therebetween.

In some aspects, the porosity of the coated sulfide-containing electrolyte material will be greater than about 5%, e.g., the porosity may be up to about 15%, about 14%, about 13%, about 12%, about 11%, about 10%, about 9%, about 8%, about 7%, about 6%, about 5%, about 4%, about 3%, or about 2%. Porosity can be determined using a suitable method. For instance, a porosity measurement can be determined as follows: Given the theoretical density of electrolyte as e, M gram of electrolyte, for example: 200 mg, are weighed and cold pressed in PEEK dye between 2 Ti rod with area A. The thickness of cold pressed electrolyte pellet will be measured and record as L. The porosity of the pellet will be calculated as porosity=$1-\rho/[(M/(A*L)]$.

In some aspects, the density of the coated sulfide-containing electrolyte material will be increased by more than about 10% compared to the sulfide-containing electrolyte material prior to coating, e.g., the density can be increased by about 15%, about 20%, about 30%, about 40%, or about 50%.

Meanwhile, the positive electrode and the negative electrode for the all-solid-state battery according to aspects of the present disclosure are not particularly limited and any suitable one known in the art can be used.

The all-solid-state battery proposed according to aspects of the present disclosure defines the constitution of the solid electrolyte as described above, and the other elements constituting the battery, that is, the positive electrode and the negative electrode, are not particularly limited in the present disclosure and follow the description below.

In an aspect, the negative electrode for the all-solid-state battery is a lithium metal alone, or negative electrode active material can be laminated on the negative electrode current collector.

The negative electrode current collector is not particularly limited as long as it is conductive without causing any chemical change in the all-solid-state battery, and for example, copper, stainless steel, aluminum, nickel, titanium, sintered carbon, copper or stainless steel whose surface is treated with carbon, nickel, titanium, silver or the like, or aluminum-cadmium alloy, etc. can be used. Additionally, as with the positive electrode current collector, the negative electrode current collector may include various forms such as a film, a sheet, a foil, a net, a porous body, a foam, and a nonwoven fabric having minute irregularities formed on their surfaces.

The negative electrode active material may be at least one of lithium metal, a lithium alloy, a lithium metal composite oxide, a lithium-containing titanium composite oxide (LTO), and a combination thereof. In this case, the lithium alloy may be an alloy of lithium and at least one metal selected from Na, K, Rb, Cs, Fr, Be, Mg, Ca, Sr, Ba, Ra, Al and Sn. Also, the lithium metal composite oxide may be lithium and an oxide ($MeO_x$) of any one metal (Me) selected from the group consisting of Si, Sn, Zn, Mg, Cd, Ce, Ni and Fe and for example, may be $LixFe_2O_3$ ($0 \leq x \leq 1$) or $LixWO_2$ ($0 \leq x \leq 1$).

In addition, the negative electrode active material may comprise one or more metal composite oxides such as $Sn_xMe_{1-x}Me'_yO_z$ (Me: Mn, Fe, Pb, Ge; Me': Al, B, P, Si, elements of groups 1, 2 and 3 of the periodic table, halogen;

0<x≤1; 1≤y≤3; 1≤z≤8); oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$, and carbon-based negative electrode active materials such as crystalline carbon, amorphous carbon or carbon composite may be used alone or in combination of two or more.

In some aspects of the present disclosure, the positive electrode may comprise a positive electrode active material layer comprising a positive electrode active material, a positive electrode conductive material and a solid electrolyte. The positive electrode active material layer may further comprise a binder resin for the positive electrode if necessary. Additionally, the positive electrode comprises a current collector if necessary, and the positive electrode active material layer may be positioned on at least one surface of the current collector.

In some aspects of the present disclosure, the positive electrode active material may comprise at least one of lithium cobalt oxide ($LiCoO_2$), lithium nickel oxide ($LiNiO_2$), lithium manganese oxide of Formula $Li_{1+x}Mn_{2-x}O_4$ (x is 0 to 0.33, for example $LiMn_2O_4$), $LiMnO_3$, $LiMn_2O_3$, $LiMnO_2$, lithium copper oxide ($Li_2CuO_2$); vanadium oxide such as $LiV_3O_8$, $LiV_2O_4$, $V_2O_5$, $Cu_2V_2O_7$, Ni-site lithium nickel oxide represented by Formula $LiNi_{1-x}M_xO_2$ (M=Co, Mn, Al, Cu, Fe, Mg, B or Ga, 0<x<1), for example, $LiNi_{1-z}(Co,Mn,Al)_2O_2$(0<z<1); lithium manganese composite oxide represented by Formula $LiMn_{2-x}M_xO_4$ (M=Co, Ni, Fe, Cr, Zn or Ta, x=0.01~1, for example, $LiMn_{1.5}Ni_{0.5}O_4$ or $Li_2Mn_3MO_8$ (M=Fe, Co, Ni, Cu or Zn); $LiMn_2O_4$ with partial substitution of alkali earth metal ion for Li in Formula; disulfide compounds; $Fe_2(MoO_4)_3$, or lithium iron phosphate ($LiFePO_4$). In some aspects of the present disclosure, the lithium iron phosphate may have all or at least part of the of the active material particle surface coated with a carbon material to improve conductivity.

According to aspects of the disclosure, the positive electrode active material may comprise at least one selected from Lithium Nickel Cobalt Manganese Oxide (for example, $Li(Ni,Co,Mn)O_2$, $LiNi_{1-z}(Co,Mn,Al)_2O_2$ (0<z<1)), Lithium Iron Phosphate (for example, LiFePO4/C), Lithium Nickel Manganese Spinel (for example, $LiNi_{0.5}Mn_{1.5}O_4$), Lithium Nickel Cobalt Aluminum Oxide (for example, $Li(Ni,Co,Al)O_2$), Lithium Manganese Oxide (for example, $LiMn_2O_4$) and Lithium Cobalt Oxide (for example, $LiCoO_2$).

According to some aspects of the present disclosure, the positive electrode active material may comprise lithium transition metal composite oxide, and the transition metal may comprise at least one of Co, Mn Ni or Al.

In some aspects of the present disclosure, the lithium transition metal composite oxide may comprise at least one of compounds represented by the following formula 1.

$Li_xNi_aCo_bMn_cM_zO_y$ [Formula 1]

In the above Formula 1, 0.5≤x≤1.5, 0<a≤1, 0≤b<1, 0≤c<1, 0≤z<1, 1.5<y<5, a+b+c+z is 1 or less, and M may comprise at least one selected from Al, Cu, Fe, Mg and B.

In some aspects of the present disclosure, the positive electrode active material includes a positive electrode active material having high Ni content of a of 0.5 or more, and its specific example may comprise $LiNi_{0.8}Co_{0.1}Mn_{0.1}O_2$.

In some aspects of the present disclosure, the positive electrode conductive material may comprise, for example, at least one conductive material selected from the group consisting of graphite, carbon black, carbon fibers or metal fibers, metal powder, conductive whiskers, conductive metal oxide, activated carbon or polyphenylene derivatives. More specifically, the positive electrode conductive material may be at least one conductive material selected from the group consisting of natural graphite, artificial graphite, super-p, acetylene black, ketjen black, channel black, furnace black, lamp black, thermal black, denka black, aluminum powder, nickel powder, zinc oxide, potassium titanate and titanium oxide.

The current collector is not limited to a particular type and may include those having high conductivity without causing a chemical change in the corresponding battery, for example, stainless steel, copper, aluminum, nickel, titanium, sintered carbon, or aluminum or stainless steel treated with carbon, nickel, titanium and silver on the surface.

The positive electrode binder resin may include polymer for electrode commonly used in the technical field. Non-limiting examples of the binder resin may include, but are not limited to, polyvinylidene difluoride, polyvinylidene fluoride-co-hexafluoropropylene, polyvinylidene fluoride-co-trichloroethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose.

In some aspects of the present disclosure, the solid electrolyte included in the positive electrode may comprise at least one selected from a polymer-based solid electrolyte, an oxide-based solid electrolyte and a sulfide-containing solid electrolyte. In some aspects of the present disclosure, the positive electrode active material may comprise the sulfide-containing solid electrolyte described in the solid electrolyte membrane.

In some aspects of the present disclosure, the positive electrode active material is included in the positive electrode in an amount of 50 wt % or more based on 100 wt % of the positive electrode active material layer. Additionally, the solid electrolyte is, according to aspects of the disclosure, included in the positive electrode in an amount of 10 wt % to 40 wt % based on 100 wt % of the positive electrode active material layer.

Meanwhile, in some aspects of the present disclosure, the positive electrode may have a loading amount (per electrode area) of 5 mAh/cm² or more, 6 mAh/cm² or more, or 10 mAh/cm² or more. In the battery according to the present disclosure, when the high loading positive electrode is applied, it is possible to operate the battery on the electrochemically stable level.

Meanwhile, in some aspects of the present disclosure, the positive electrode active material layer may be obtained by adding the positive electrode active material, the conductive material, the binder resin and the solid electrolyte to an appropriate solvent to prepare a slurry and casting the slurry, or may be obtained by a manufacturing method according to a dry mixing process without a solvent. Meanwhile, in some aspects of the present disclosure, it is possible to achieve the uniform mixing of the positive electrode materials in the positive electrode, thereby obtaining a high loading positive electrode, and in this aspect, the positive electrode is obtained by the dry mixing process using no solvent.

The method of manufacturing the positive electrode active material layer by the dry mixing method may be described, for example, as below. First, the positive electrode materials comprising the positive electrode active material, the conductive material and the binder resin are put into a mixing device and mixed by a mechanical method to obtain a mixture. The mixing device includes any type of device that can form a comparatively homogeneous mixture phase such as a well-known mixer agitator, and is not limited to a particular type of device. Meanwhile, in some aspects of the present disclosure, to improve the dispersion of solids and induce the fibrous form of the binder resin in the mixing process, a temperature rising process may be included. In the temperature rising process, the temperature may be appropriately controlled in the range of about 30° ° C. to 100° C. Subsequently, the positive electrode active material layer may be formed by extracting the mixture into the shape of an electrode (a wide film shape) using an extruder, and adjusting the thickness through a pressing process. The positive electrode active material layer may be applied to the electrode with no current collector, or if necessary, the current collector may be attached to the obtained positive electrode active material layer to prepare the positive electrode including the current collector.

EXAMPLES

The following examples are not intended to be limiting. The above disclosure provides many different aspects for implementing the features of the disclosure, and the following examples describe certain aspects. It will be appreciated that other modifications and methods known to one of ordinary skill in the art can also be applied to the following experimental procedures, without departing from the scope of the disclosure.

Preparation Example 1

(1) Preparation of 1-Undecanethiol Coated $Li_6PS_5Cl$

Sulfide solid state electrolyte, e.g., $Li_6PS_5Cl$ (LPSC, purchased from NEI corporation) was used as received. All samples were handled in a glovebox with oxygen and water levels less than 0.5 ppm. An amount of 600 mg of $Li_6PS_5Cl$ and 120 mg 1-undecanethiol (Sigma Aldrich) (at a 5:1 weight ratio) were measured into a 30 mL plastic vial with zirconium balls and spin mixed with a planetary mixer (THINKY™) for 20 minutes at 2000 rpm. After mixing, the samples were taken into a vacuum oven to dry excess solvent and moisture from the surface of the materials. The samples were dried under vacuum at 80° ° C. for 2 hours with a heating ramp of 1° C./min. The samples were then moved into the glovebox for further use.

Figure 1:
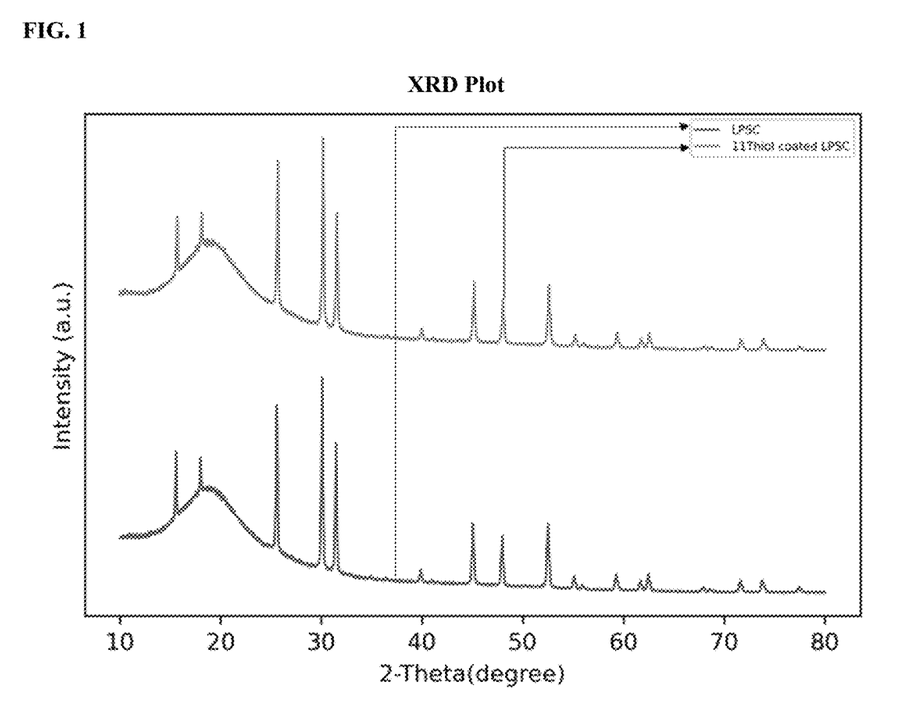
FIG. 1 is an x-ray powder diffraction (XRD), showing the coated LPSC product (upper curve), as compared to the uncoated LPSC starting material (lower curve).
Figure 2:
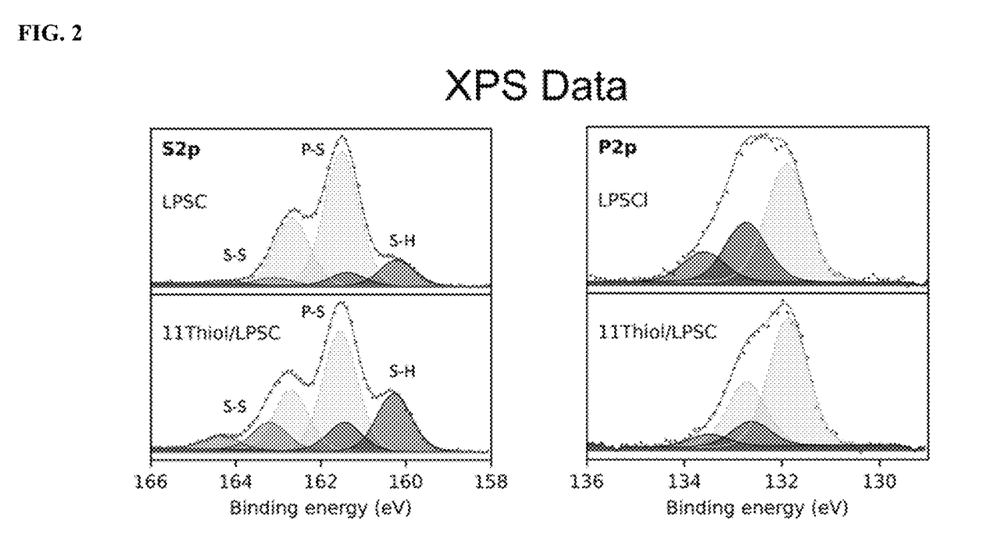
FIG. 2 is an x-ray photoelectron spectroscopy (XPS), showing the coated LPSC product (lower curve), as compared to the uncoated LPSC starting material (upper curve). The main peaks of interests are the S 2p and P 2p as it contains the main characteristic bonds for LPSC.
Figure 3:
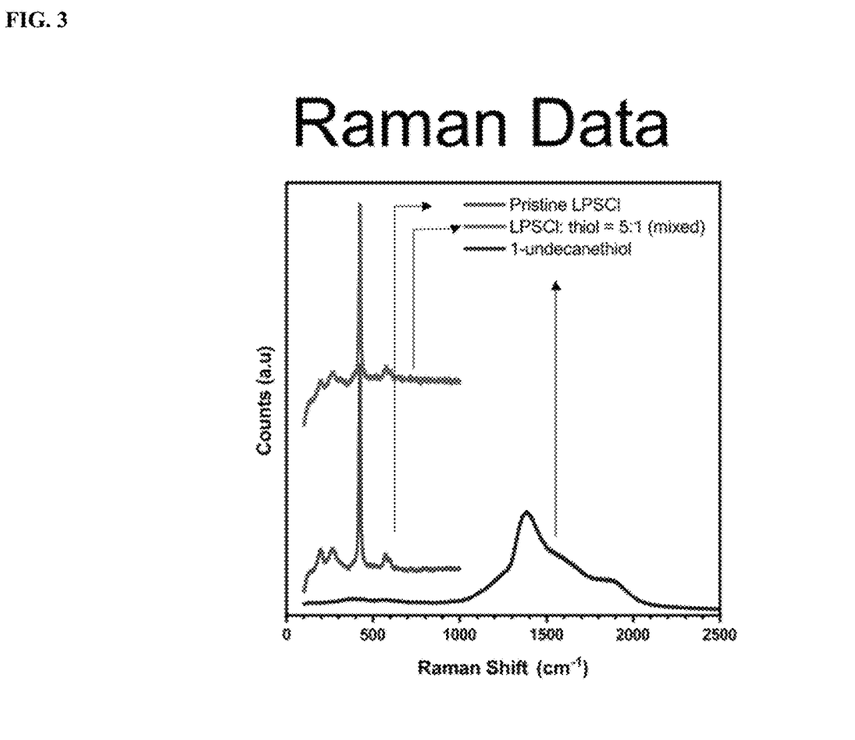
FIG. 3 is a Raman spectra, showing the coated LPSC, as compared to the starting material.

FIG. 1 is an x-ray powder diffraction (XRD), showing the coated LPSC product (upper curve), as compared to the uncoated LPSC starting material (lower curve). FIG. 2 is an x-ray photoelectron spectroscopy (XPS), showing the coated LPSC product (lower curve), as compared to the uncoated LPSC starting material (upper curve). The main peaks of interests are the S 2p and P 2p as it contains the main characteristic bonds for LPSC. FIG. 3 is a Raman spectra, showing the coated LPSC, as compared to the starting material. The XRD, XPS and Raman data show that there were no new phases formed and the integrity of the original structure of LPSC remained unchanged, indicating the 1-undecanethiol has functioned successfully as a protecting agent.

(2) Preparation of Solid Electrolyte Pellets

The dry samples from above were grinded by hand in glove box and cold pressed into dense pellets under 2500 psi for the measurement of pellet density. The pellets are 13 mm in diameter and 470 um for 100 mg pellets and 1200 um for 260 mg pellets. The pellets were prepared by pressing the powder with titanium rods in a PEEK Swagelok die. By calculation and cross section SEM characterizations, the 1-undecanethiol coating on sulfide solid state electrolyte, e.g., LPSC, dramatically reduced pellet density from 9% down to 1.6%.

(3) Preparation of All-Solid-State Battery (ASSB)

To evaluate the electrochemical performances of the above-mentioned densified sulfide SSEs samples, all-solid-state batteries (ASSB) with a diameter of 13 mm, composed of polyaryletheretherketone (PEEK) mold and Ti rods were assembled. The lithium metal symmetric cells were fabricated with 100 μm Li metal as both electrodes. Pristine LPSC or 1-undecanethiol coated densified LPSC was used as the electrolyte. Cell measurements were conducted on a LAND multi-channel battery testing system. The galvanostatic charge-discharge tests of symmetric cells were carried out at 0.1 and 1.0 mA/cm2 under room temperature (20-25° C.) with each step lasting 1 hr. Critical current density (CCD) test applied a step wise increase in current density to the cell with each step lasting 30 minutes.

Without electrolyte coating and densification, a symmetric cell using LPSC as electrolyte failed at 0.6 mA $cm^{-2}$ and could only cycle under 0.1 mA cm–2 for 10 hours. Using 1-undecanethiol coated LPSC electrolyte pellets after densification, the symmetric cell has four times higher critical current density of 2.5 mA $cm^{-2}$ and was able to cycle under 1 mA cm–2 for more than half a year. This observation proves the remarkable current density improvement of densified LPSC by 1-undecanethiol coating.

Figure 4:
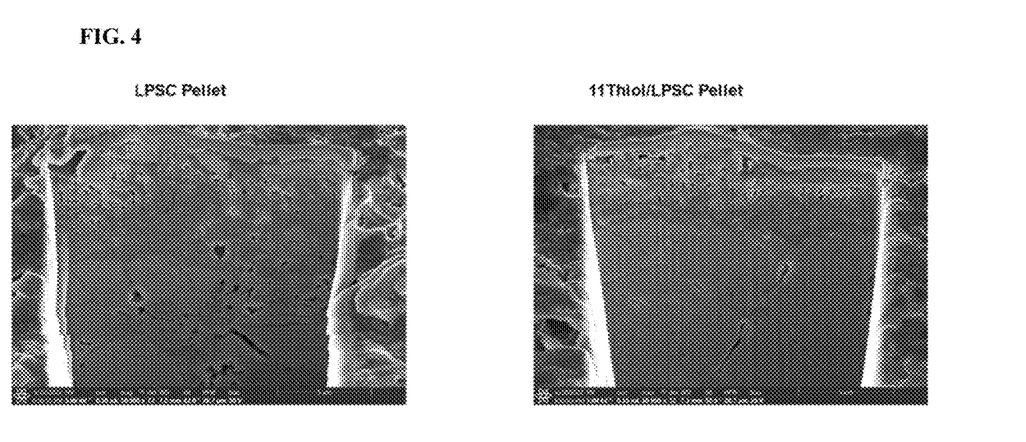
FIG. 4 shows a FIB-SEM (Focused Ion Beam Scanning Electron Microscopy) cross-sectional image of a solid electrolyte material made from LPSCl pellets, compared to a solid electrolyte material made from 1-undecanethiol coated LPSCl pellets.

FIG. 4 shows a FIB-SEM (Focused Ion Beam Scanning Electron Microscopy) cross-sectional image of a solid electrolyte material made from LPSC pellets, compared to a solid electrolyte material made from 1-undecanethiol coated LPSC pellets. As shown in the images, the solid electrolyte material made from 1-undecanethiol coated LPSC pellets has fewer cracks and voids.

Figure 5:
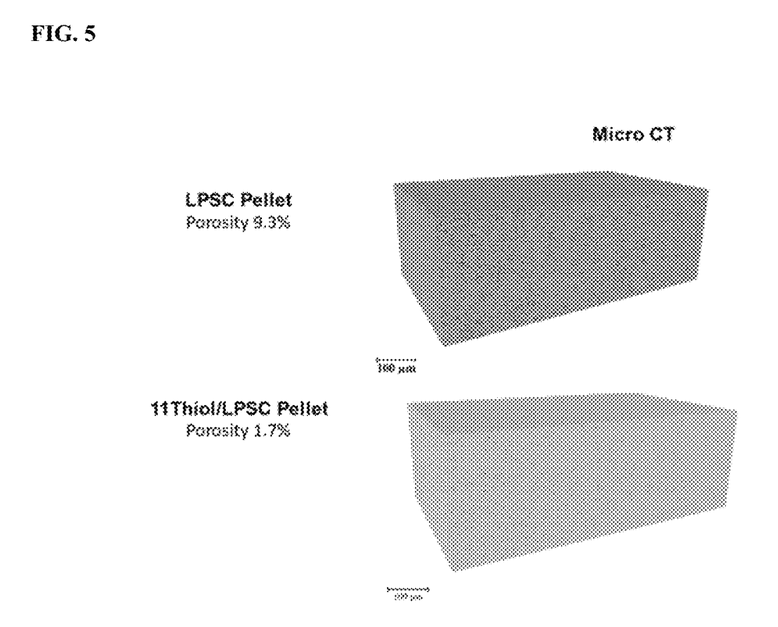
FIG. 5 shows a micro-CT (micro computed tomography) image for a LPSCl Pellet having a porosity of 9.25%, compared to a 1-undecanethiol coated LPSCl having a porosity of 1.66%.

FIG. 5 shows a micro-CT (micro computed tomography) image for a LPSC Pellet having a porosity of 9.3%, compared to a 1-undecanethiol coated LPSC having a porosity of 1.7%. The white color indicates the sulfide electrolyte LPSC pellet and black dots indicate the pores and voids in the pellet. With 1-undecanethiol's coating, the pores and voids amount are dramatically reduced comprehensively. The porosity can be measured according to a suitable method. For instance, the porosity measurement can be carried out as follows: Given the theoretical density of electrolyte as ρ, M gram of electrolyte, for example: 200 mg, are weighed and cold pressed in PEEK dye between 2 Ti rod with area A. The thickness of cold pressed electrolyte pellet will be measured and record as L. The porosity of the pellet will be calculated as porosity=1–ρ/[M/(A*L)].

Figure 6:
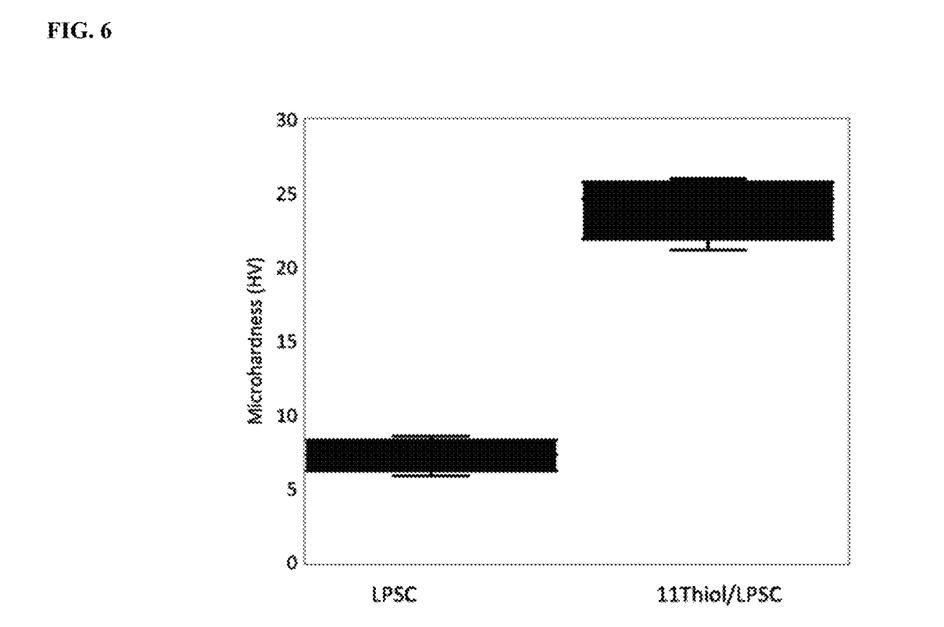
FIG. 6 shows the results of an indentation test to determine the microhardness (HV) of LPSCl pellets, compared to 1-undecanethiol coated LPSCl pellets.

FIG. 6 shows the results of an indentation test to determine the microhardness (HV) of LPSC pellets, compared to 1-undecanethiol coated LPSC pellets. Each of the samples was formed into a film of 500 μm. In the microindentation test, a diamond or stainless steel indenter of specific geometry was impressed into the surface of the test samples (the top view and side views are shown in FIG. 6), using an applied load of 1 kg force, at room temperature. The microindenter monitors and records the load and displacement of the indenter and obtains an indentation load-depth curve as shown. The bars show the biggest and smallest values. The height is the value distribution. The x-axis is sample's name and the width does not signify anything.

(3) Cell Fabrication and Cyclability Measurements

To evaluate the electrochemical performances of the above-mentioned solid electrolyte samples, a symmetric cell was assembled composed of a sulfide-containing solid electrolyte (SSE) made from a layer (700-1200 μm) of the pristine LPSC pellets, and a symmetric cell was assembled composed of a sulfide-containing solid electrolyte made from a layer (700-1200 μm) of the 1-undecanethiol coated LPSC pellets. The symmetric cells were fabricated with 100 μm Li metal as both electrodes.

A layer of pristine LPSC (~500 μm) electrolyte was placed between cathode and 1-undecanethiol coated LPSC. Cell measurements were made on a LAND multi-channel battery testing system. The galvanostatic charge-discharge tests of symmetric cells were carried out at 0.1 mA/cm$^2$ for LPSC and 1 mA/cm$^2$ for 1-undecanethiol coated LPSC under room temperature (20-25° C.) with each step lasting 1 hr. The galvanostatic charge-discharge tests of full cells were conducted within the voltage range of 2.5 to 4.25 V at a rate of 0.1 C under 60° C.

Figure 7A:
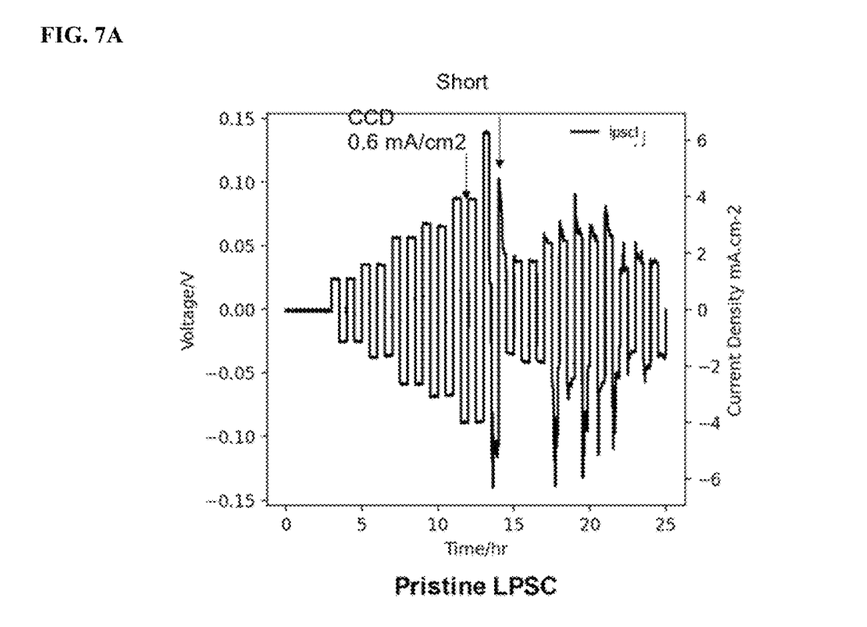
FIGS. 7A and 7B show the results of a test to determine the CCD (critical current density) using a lithium symmetric cell of a cell where the electrolyte comprises LPSCl pellets (FIG. 7A), compared to a cell where the electrolyte comprises 1-undecanethiol coated LPSCl pellets (FIG. 7B).
Figure 7B:
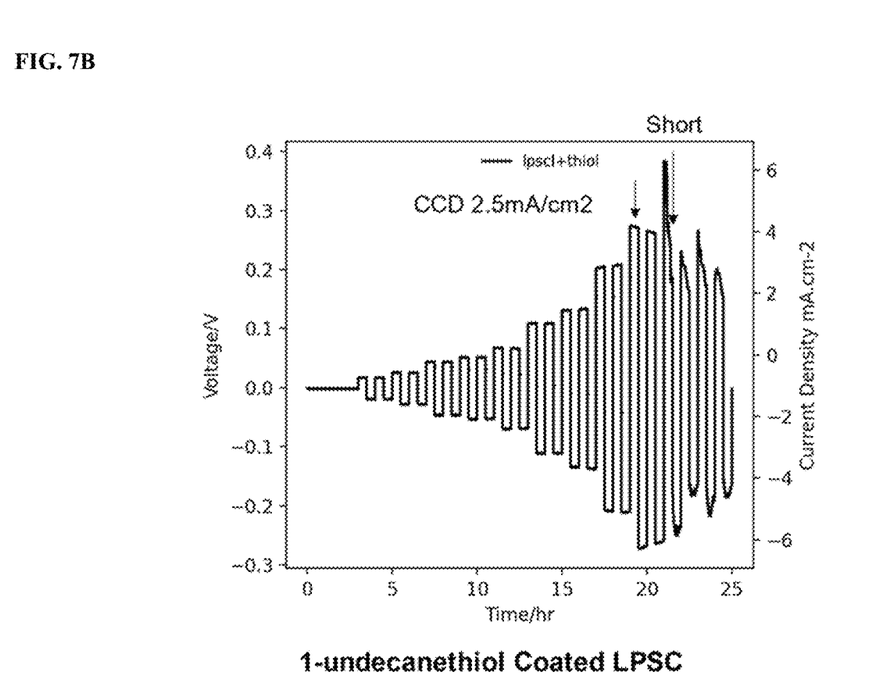

FIG. 7 shows the result of a test to determine the CCD (critical current density) using a lithium symmetric cell of a cell where the electrolyte comprises LPSC pellets, compared to a cell where the electrolyte comprises 1-undecanethiol coated LPSC pellets.

Figure 8A:
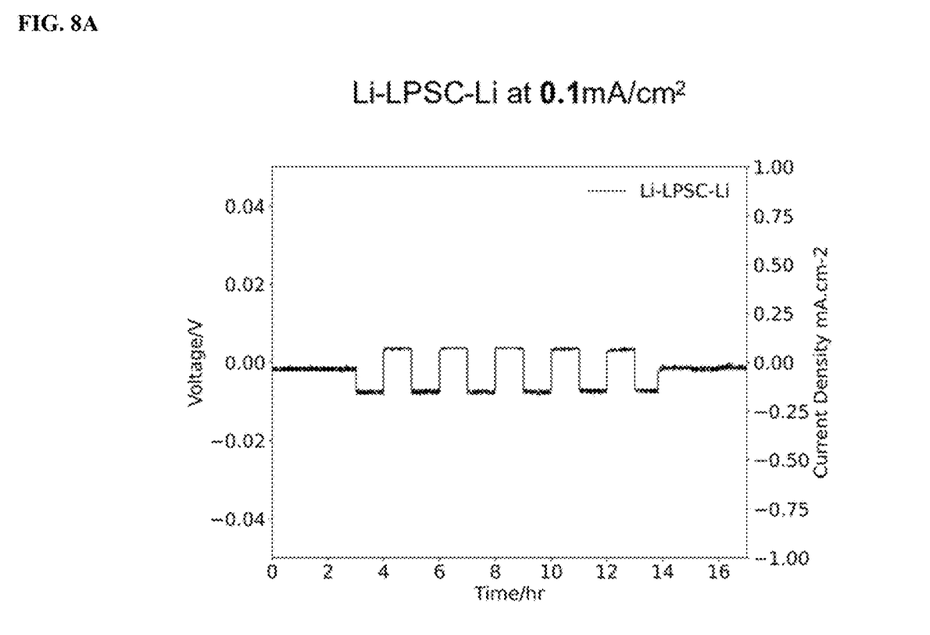
FIGS. 8A and 8B show current density ($mA/cm^2$) and voltage (V) as a function of time at 0.1 $mA/cm^2$ for a lithium symmetric cell of a cell where the electrolyte comprises LPSCl pellets (FIG. 8A), compared to a cell where the electrolyte comprises 1-undecanethiol coated LPSCl pellets (FIG. 8B) at 1 $mA/cm^2$.
Figure 8B:
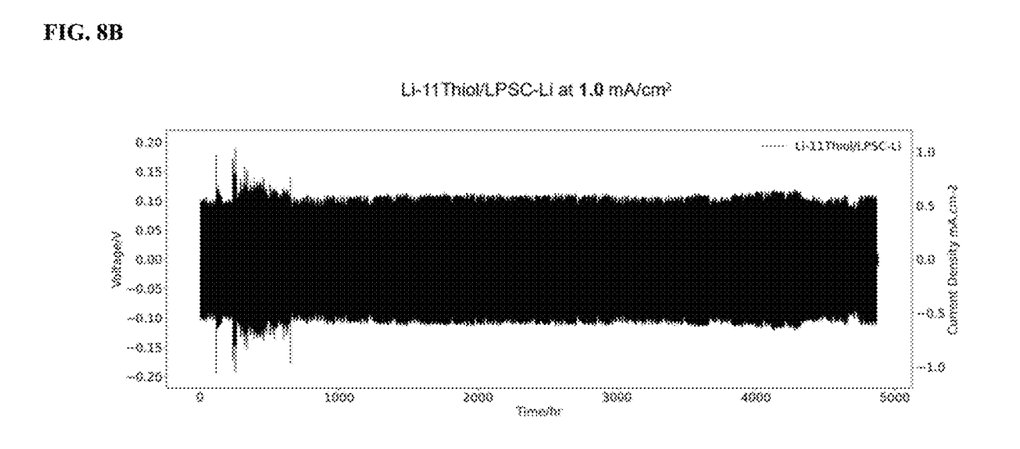

FIG. 8 shows current density (mA/cm$^2$) and voltage (V) as a function of time at 0.1 mA/cm$^2$ for a lithium symmetric cell of a cell where the electrolyte comprises LPSC pellets, compared to a cell where the electrolyte comprises 1-undecanethiol coated LPSC pellets.

It will be understood by those of ordinary skill in the art that aspects of the present disclosure can be performed within a wide equivalent range of parameters without affecting the scope of the disclosure described herein. All publications, patent applications and patents disclosed herein are incorporated by reference in their entirety.

What is claimed is:

1. A solid electrolyte composition comprising:
   a sulfide-containing solid electrolyte material, having a surface; and
   an organic coating, wherein the organic coating is formed on the surface of the sulfide-containing solid state electrolyte material,
   wherein the coating is formed from at least one compound of Chemical Formula 1, and optionally Chemical Formula 2:

R-A      Chemical Formula (1)

R-A'-R      Chemical Formula (2)

wherein:
   A is a SH group, an isocyanate, an amine, or a leaving group;
   A' is a —S-moiety or a —S—S— moiety; and
   each R is independently a substituted or unsubstituted C3-C20 alkyl group, and
   wherein the compound of Chemical Formula 1 is 1-undecanethiol.

2. The solid electrolyte composition according to claim 1, wherein the compound of Chemical Formula 1 or Chemical Formula 2 is attached to the surface of the sulfide-containing solid state electrolyte material by chemisorption, van der Waals interaction, or ionic interaction.

3. The solid electrolyte composition according to claim 1, wherein the compound of Chemical Formula 1 or Chemical Formula 2 reacts with the sulfide-containing solid state electrolyte material to form a covalent bond.

4. The solid electrolyte composition according to claim 1, wherein in the compound of Chemical Formula 2, at least one of R is a C6-C16 alkyl group.

5. The solid electrolyte composition according to claim 1, wherein in the compound of Chemical Formula 2, at least one of R is a C8-C12 alkyl group.

6. The solid electrolyte composition according to claim 1, wherein the compound of Chemical Formula 2 has a total of 6 to 16 carbons.

7. The solid electrolyte composition according to claim 1, wherein in the compound of Chemical Formula 2 has a total of 8 to 12 carbons.

8. The solid electrolyte composition according to claim 1, wherein in the compound of Chemical Formula 2, at least one of R is a substituted C3-C20 alkyl group, wherein there are one or more substituents selected from fluorine, chlorine, bromine, ester or ketone moieties.

9. The solid electrolyte composition according to claim 1, wherein the solid electrolyte composition is in pellet form.

10. The solid electrolyte composition according to claim 1, wherein the sulfide-containing solid electrolyte material is an inorganic electrolyte.

11. The solid electrolyte composition according to claim 1, wherein the sulfide-containing solid electrolyte comprises at least one selected from $Li_3P_7S_{11}$, $Li_{10}GeP_2S_{12}$, and $Na_3PS_4$ and/or $Li_6PS_5Cl$.

12. The solid electrolyte composition according to claim 1, wherein the sulfide-containing solid electrolyte comprises at least one selected from LPS-based glass or glass ceramic of formula $xLi_2S \cdot yP_2S_5$, wherein x+y=1.

13. The solid electrolyte composition according to claim 1, wherein the sulfide-containing solid electrolyte comprises an argyrodite-based solid electrolyte of formula $Li_6PS_5X$, wherein X is Cl, Br, or I.

14. The solid electrolyte composition according to claim 1, wherein the sulfide-containing solid electrolyte comprises an argyrodite-based solid electrolyte of formula $Li_{6-y}PS_{5-y}Cl_{1+y}$, where y is <1.

15. A method for making the solid electrolyte composition according to claim 1, comprising:
   providing a sulfide-containing solid electrolyte material, and
   combining the solid electrolyte with at least one compound of Chemical Formula 1, and optionally Chemical Formula 2:

R-A      Chemical Formula (1)

R-A'-R      Chemical Formula (2)

wherein:
   A is a SH group, an isocyanate, an amine, or a leaving group;
   A' is a —S— moiety or a —S—S— moiety; and
   each R is independently a substituted or unsubstituted C3-C20 alkyl group,
   wherein the compound of Chemical Formula 1 is 1-undecanethiol.

16. A method for making a solid electrolyte, comprising:
   providing a sulfide-containing solid electrolyte,
   combining the solid electrolyte with at least one compound of Chemical Formula 1, and optionally Chemical Formula 2 to form a coated solid electrolyte composition:

R-A      Chemical Formula (1)

R-A'-R      Chemical Formula (2)

wherein:
A is a SH group, an isocyanate, an amine, or a leaving group;
A' is a —S; and
each R is independently a substituted or unsubstituted C3-C20 alkyl group;
forming pellets from the coated solid electrolyte composition; and
pressing the pellets to form a solid electrolyte,
wherein the compound of Chemical Formula 1 is 1-undecanethiol.

17. An all solid state battery comprising:
a negative electrode,
a positive electrode; and
a solid electrolyte comprising the solid electrolyte composition according to claim 1, wherein the solid electrolyte is interposed between the negative electrode and the positive electrode.

18. A solid electrolyte composition comprising:
a sulfide-containing solid electrolyte material, having a surface; and
an organic coating, wherein the organic coating is formed on the surface of the sulfide-containing solid state electrolyte material, and
wherein the coating is formed from at least one compound of Chemical Formula 1 or Chemical Formula 2:

R-A             Chemical Formula (1)

R-A'-R           Chemical Formula (2)

wherein:
A is a SH group, an isocyanate, or an amine;
A' is a —S-moiety or a —S—S— moiety; and
each R is independently a substituted or unsubstituted C3-C20 alkyl group.

19. The solid electrolyte composition according to claim 18, wherein the compound of Chemical Formula 1 or Chemical Formula 2 is attached to the surface of the sulfide-containing solid state electrolyte material by chemisorption, van der Waals interaction, or ionic interaction.

20. The solid electrolyte composition according to claim 18, wherein the compound of Chemical Formula 1 or Chemical Formula 2 reacts with the sulfide-containing solid state electrolyte material to form a covalent bond.

21. The solid electrolyte composition according to claim 18, wherein in the compound of Chemical Formula 1, A is the SH group.

22. The solid electrolyte composition according to claim 18, wherein in the compound of Chemical Formula 1 or Chemical Formula 2, at least one of R is a C6-C16 alkyl group.

23. The solid electrolyte composition according to claim 18, wherein in the compound of Chemical Formula 1 or Chemical Formula 2, at least one of R is a C8-C12 alkyl group.

24. The solid electrolyte composition according to claim 18, wherein the compound of Chemical Formula 1 or Chemical Formula 2 has a total of 6 to 16 carbons.

25. The solid electrolyte composition according to claim 18, wherein the compound of Chemical Formula 1 or Chemical Formula 2 has a total of 8 to 12 carbons.

26. The solid electrolyte composition according to claim 18, wherein in the compound of Chemical Formula 1 or Chemical Formula 2, at least one of R is a substituted C3-C20 alkyl group, wherein there are one or more substituents selected from fluorine, chlorine, bromine, ester or ketone moieties.

27. The solid electrolyte composition according to claim 18, wherein the compound of Chemical Formula 1 is 1-undecanethiol.

28. The solid electrolyte composition according to claim 18, wherein the solid electrolyte composition is in pellet form.

29. The solid electrolyte composition according to claim 18, wherein the sulfide-containing solid electrolyte material is an inorganic electrolyte.

30. The solid electrolyte composition according to claim 18, wherein the sulfide-containing solid electrolyte comprises at least one selected from $Li_3P_7S_{11}$, $Li_{10}GeP_2S_{12}$, and $Na_3PS_4$ and/or $Li_6PS_5Cl$.

31. The solid electrolyte composition according to claim 18, wherein the sulfide-containing solid electrolyte comprises at least one selected from LPS-based glass or glass ceramic of formula $xLi_2S \cdot yP_2S_5$, wherein x+y=1.

32. The solid electrolyte composition according to claim 18, wherein the sulfide-containing solid electrolyte comprises an argyrodite-based solid electrolyte of formula $Li_6PS_5X$, wherein X is Cl, Br, or I.

33. The solid electrolyte composition according to claim 18, wherein the sulfide-containing solid electrolyte comprises an argyrodite-based solid electrolyte of formula $Li_{6-y}PS_{5-y}Cl_{1+y}$, where y is <1.

34. A method for making the solid electrolyte composition according to claim 18, comprising:
providing a sulfide-containing solid electrolyte material, and
combining the solid electrolyte with at least one compound of Chemical Formula 1 or Chemical Formula 2:

R-A             Chemical Formula (1)

R-A'-R           Chemical Formula (2)

wherein:
A is a SH group, an isocyanate, or an amine;
A' is a —S— moiety or a —S—S— moiety; and
each R is independently a substituted or unsubstituted C3-C20 alkyl group.

35. A method for making a solid electrolyte, comprising:
providing a sulfide-containing solid electrolyte,
combining the solid electrolyte with at least one compound of Chemical Formula 1 or Chemical Formula 2 to form a coated solid electrolyte composition:

R-A             Chemical Formula (1)

R-A'-R           Chemical Formula (2)

wherein:
A is a SH group, an isocyanate, or an amine;
A' is a —S—; and
each R is independently a substituted or unsubstituted C3-C20 alkyl group;
forming pellets from the coated solid electrolyte composition; and
pressing the pellets to form a solid electrolyte.

36. An all solid state battery comprising:
a negative electrode,
a positive electrode; and
a solid electrolyte comprising the solid electrolyte composition according to claim 18, wherein the solid electrolyte is interposed between the negative electrode and the positive electrode.

* * * * *